UNITED STATES PATENT OFFICE.

JAMES NOAD, OF LONDON, ENGLAND, ASSIGNOR OF ONE-HALF TO ROWLAND MATTHEWS, OF SAME PLACE.

MANUFACTURE OF WHITE LEAD AND COLORED PIGMENTS.

SPECIFICATION forming part of Letters Patent No. 508,115, dated November 7, 1893.

Application filed January 26, 1893. Serial No. 459,862. (No specimens.)

*To all whom it may concern:*

Be it known that I, JAMES NOAD, a subject of the Queen of Great Britain, residing at Eastham, London, in the county of Essex, England, have invented certain new and useful Improvements in the Manufacture of White Lead and Colored Pigments, of which the following is a specification.

This invention relates to improvements in the manufacture of what is commonly known as white lead and to the manufacture of colored pigments.

According to my invention I take any lead oxide litharge or massicot or a natural carbonate of lead heated to form an oxide of lead and grind same in water until a lead float is obtained. The float so produced I treat with solution composed of acetic acid and glycerine. The following proportion I find answers well in practice: For every twenty ounces of lead float, I add one ounce of glycerine and one ounce of acetic acid of a specific gravity of 1040. The mixture is agitated by any well known mechanical means and when it commences to stiffen water is added in small quantities at a time, until it becomes of a pasty consistency. It is then allowed to stand for from twenty-four to forty-eight hours; sufficient water being added to enable it to be readily agitated. At this stage, it is found of advantage to float off the light particles leaving any metallic lead or unconverted oxide to be returned to the mill which grinds the lead float. The liquor containing the light particles which have been floated off is treated with sufficient carbonic acid gas to form carbonate of lead. An excess of gas should be avoided; otherwise a normal carbonate of lead will be formed which is deficient in covering power. The bath is then run off from the mixer and treated with a dilute solution of soda or other alkali to remove all traces of the acid that may remain after which the carbonate of lead is washed and dried. The use of the glycerine in the manner stated prevents the oxide of lead from setting into a hard mass, and, also, by attracting the smaller particles of float lead the glycerine causes them to remain in suspension until acted on. The glycerine besides alters the precipitate in that it has no appearance of being crystalline.

The proportion of carbonate and unconverted oxide of lead in the finished product may be varied by varying the strength of the solutions and the duration of their action and in lieu of introducing the carbonic acid gas after the agitation period it may be introduced at an earlier part of the process or even introduced into the solution of glycerine, acetic acid and lead float. It is indeed of advantage to introduce at intervals small quantities of carbonic acid gas during the period that the float is being acted on say in all not to exceed about one cubic foot for every seven pounds of lead suspended in the solution but the quantity should be much less than what is required to complete the conversion to carbonate.

When I desire to produce a colored pigment I add to the bath suitable coloring agents which are not liable to be injuriously acted upon by the substances present and proceed as above described but I do not always find it necessary to remove the traces of acid as above described inasmuch as the coloring agents themselves may be alkaline and if I wish to increase the brilliancy of the pigments instead of using acetic acid I may substitute for the acetic acid any other suitable acid for example nitric acid of say a strength of 1.420°. As an example of this part of my process let it be assumed that I wish to produce a blue pigment. Then before adding the bulk of the carbonic acid I add for each one hundred pounds of float lead in the bath a solution of yellow prussiate of potash of a strength sufficient to introduce about one per cent. of that substance and agitate the bath occasionally for say half an hour after which I add a solution of ferric chloride or other iron salt in sufficient quantity to introduce about two and one half per cent. of that substance the bath being agitated for a further period of about fifteen minutes after which hydrochloric acid or other suitable acid is added in sufficient quantity to produce the shade of blue required.

The pigment is then dried. To produce a canary yellow I add to the bath about three and one half per cent. of bichromate of potash or I may use chromic acid the pigment being then thrown down if necessary by the use of carbonic acid. For an orange or deep red I use the same quantity of bichromate of potash and then cause the bath to be heated or made to boil until the desired shade is obtained. The pigment is then dried.

Having now particularly described and ascertained the nature of my said invention and in what manner the same is to be performed, I declare that what I claim is—

1. In the manufacture of white lead and colored pigments treating the material with a solution containing glycerine substantially as set forth.

2. The process of manufacturing white lead which consists in treating the float lead with a solution containing glycerine and acetic or other suitable acid and admitting carbonic acid to the bath and finally neutralizing it with an alkali substantially as set forth.

In testimony whereof I have hereunto set my hand in the presence of two subscribing witnesses.

JAMES NOAD.

Witnesses:
GEO. M. FRANKLIN,
THOMAS LAKE,
*Both of* 17 *Gracechurch Street, London.*